(12) United States Patent
Umlauf

(10) Patent No.: US 12,409,763 B2
(45) Date of Patent: Sep. 9, 2025

(54) VEHICLE DOOR GUARD

(71) Applicant: 4Knines, LLC, Oklahoma City, OK (US)

(72) Inventor: James Umlauf, Glendale, AZ (US)

(73) Assignee: 4Knines, LLC, Oklahoma City, OK (US)

( * ) Notice: Subject to any disclaimer, the term of this patent is extended or adjusted under 35 U.S.C. 154(b) by 318 days.

(21) Appl. No.: 17/834,670

(22) Filed: Jun. 7, 2022

(65) Prior Publication Data

US 2023/0391238 A1 Dec. 7, 2023

(51) Int. Cl.
*B60N 2/58* (2006.01)
*B60N 2/60* (2006.01)

(52) U.S. Cl.
CPC .......... *B60N 2/5833* (2013.01); *B60N 2/60* (2013.01); *B60N 2/6009* (2013.01); *B60N 2/6036* (2013.01)

(58) Field of Classification Search
CPC ...... B60N 2/5833; B60N 2/60; B60N 2/6009; B60N 2/6036
See application file for complete search history.

(56) References Cited

U.S. PATENT DOCUMENTS

| | | | | |
|---|---|---|---|---|
| 2,641,773 A * | 6/1953 | Kramer | ............... | B60N 2/2854 5/94 |
| 3,735,430 A * | 5/1973 | Platz | ................... | A47D 9/005 5/118 |
| 4,512,286 A * | 4/1985 | Rux | ..................... | A01K 1/0272 119/771 |
| 4,924,814 A * | 5/1990 | Beaudet | ............. | A01K 1/0272 280/749 |
| 4,943,105 A * | 7/1990 | Kacar | ................ | B60N 2/2854 297/229 |
| 5,133,294 A * | 7/1992 | Reid | ................... | A01K 1/0272 119/771 |
| 5,215,345 A * | 6/1993 | Orphan | ............... | B60N 2/6009 296/37.16 |
| 5,294,166 A * | 3/1994 | Shapland | ........... | B60N 2/6036 297/229 |
| 5,322,335 A * | 6/1994 | Niemi | .................... | B60R 13/01 296/97.23 |
| 5,487,361 A * | 1/1996 | Dean | ................... | A01K 1/0272 119/28.5 |
| 6,352,299 B1 * | 3/2002 | Ames | ..................... | B60J 1/025 297/228.1 X |
| 6,676,209 B1 * | 1/2004 | Szabo | .................... | B60R 7/043 297/229 |
| 6,926,341 B1 * | 8/2005 | Addesso | .............. | B60R 11/00 296/153 |
| 7,261,375 B2 * | 8/2007 | Godshaw | ............ | A01K 1/0272 297/229 |

(Continued)

*Primary Examiner* — Rodney B White
(74) *Attorney, Agent, or Firm* — David R. Conklin; Kirton McConkie

(57) ABSTRACT

Vehicle door guards can be used in conjunction with a vehicle seat cover to provide protection to doors. A vehicle door guard may include a cover portion that is configured to be secured to a lower portion of a vehicle seat cover when the vehicle seat cover is installed on a vehicle seat. The vehicle door guard may also include one or more fasteners for supporting the cover portion from a portion of the vehicle.

19 Claims, 16 Drawing Sheets

(56) References Cited

U.S. PATENT DOCUMENTS

| | | | | |
|---|---|---|---|---|
| 7,287,813 B2* | 10/2007 | Aliev | B60R 13/011 | |
| | | | 297/229 | |
| 7,677,662 B2* | 3/2010 | Thompson | B60N 2/6009 | |
| | | | 297/228.12 X | |
| 8,414,071 B2* | 4/2013 | Rabson | A47C 31/113 | |
| | | | 297/228.12 X | |
| 8,870,283 B2* | 10/2014 | Daley | B60N 2/28 | |
| | | | 297/228.12 X | |
| 9,402,369 B2* | 8/2016 | Burns Baker | B60R 7/046 | |
| 9,610,877 B2* | 4/2017 | Umlauf | B60N 2/6018 | |
| 9,669,742 B1* | 6/2017 | Bailey | B60R 5/006 | |
| 9,815,395 B2* | 11/2017 | Umlauf | B60N 2/60 | |
| 9,845,033 B1* | 12/2017 | Umlauf | B60N 2/6018 | |
| 9,878,646 B2* | 1/2018 | Umlauf | B60R 5/04 | |
| 9,963,086 B2* | 5/2018 | Umlauf | B60N 2/60 | |
| 10,081,278 B1* | 9/2018 | Balzer | B60N 2/60 | |
| 10,343,568 B2* | 7/2019 | Umlauf | B60N 2/6036 | |
| 10,363,847 B2* | 7/2019 | Umlauf | B60N 2/6018 | |
| 10,406,951 B2* | 9/2019 | Leon Guerrero | B60N 2/6009 | |
| 10,518,676 B2* | 12/2019 | Umlauf | B60J 7/0007 | |
| 10,647,233 B2* | 5/2020 | Umlauf | B60R 13/011 | |
| 10,960,798 B1* | 3/2021 | Li | B60N 2/876 | |
| 11,135,952 B2* | 10/2021 | Umlauf | B60N 2/6018 | |
| 11,345,265 B2* | 5/2022 | Wang | B60N 2/6027 | |
| 11,432,527 B1* | 9/2022 | Pan | B60N 2/6027 | |
| 11,535,132 B2* | 12/2022 | Umlauf | B60N 2/36 | |
| 11,691,550 B2* | 7/2023 | Umlauf | B60N 2/6027 | |
| | | | 297/229 | |
| 11,844,328 B2* | 12/2023 | Pan | B60N 2/6009 | |
| 2004/0183347 A1* | 9/2004 | Szabo | B60N 2/60 | |
| | | | 297/229 | |
| 2005/0236874 A1* | 10/2005 | Godshaw | B60N 2/6009 | |
| | | | 119/28.5 | |
| 2008/0179926 A1* | 7/2008 | Kushner | B60N 2/6018 | |
| | | | 297/229 | |
| 2016/0066694 A1* | 3/2016 | Blakeney | A47C 7/021 | |
| | | | 297/228.13 X | |
| 2016/0107552 A1* | 4/2016 | Wakeman | B60N 2/6009 | |
| | | | 297/229 | |
| 2019/0327932 A1* | 10/2019 | Adrain | B60N 2/6018 | |

\* cited by examiner

VEHICLE DOOR GUARD

CROSS-REFERENCE TO RELATED APPLICATIONS

N/A

BACKGROUND

The present invention relates to a vehicle door guard. In particular, the present invention relates to a vehicle door guard that can be used in conjunction with a vehicle seat/cargo cover to extend protection to the door and other areas to the sides of a vehicle's seat(s) and/or cargo bed. Many vehicle seat covers exist but provide minimal, if any, protection to the door and surrounding areas.

BRIEF SUMMARY

The present invention extends to vehicle door guards that can be used in conjunction with a vehicle seat cover to provide protection to doors. A vehicle door guard may include a cover portion that is configured to be secured to a lower portion of a vehicle seat cover when the vehicle seat cover is installed on a vehicle seat. The vehicle door guard may also include one or more fasteners for supporting the cover portion from a portion of the vehicle.

In some embodiments, the present invention may be implemented as a vehicle door guard that includes a cover portion and one or more fasteners. The cover portion may have a top and a bottom and may include a fastening strip that is positioned towards the bottom. The fastening strip may be configured to secure the cover portion to a lower portion of a vehicle seat cover when the vehicle seat cover is installed on a vehicle seat in a vehicle. The one or more fasteners may extend from the cover portion and may be configured to support the cover portion from a portion of the vehicle.

In some embodiments, the fastening strip may be configured to secure the cover portion to an underside of the lower portion of the vehicle seat cover.

In some embodiments, the fastening strip may include one of: a hook and loop material, an adhesive material, or a magnetic material.

In some embodiments, the fastening strip may extend across a width of the cover portion.

In some embodiments, the cover portion may include a fold line towards the bottom and the fastening strip may be positioned between the fold line and the bottom.

In some embodiments, the one or more fasteners may extend from the top of the cover portion.

In some embodiments, each of the one or more fasteners may extend from a corner of the cover portion.

In some embodiments, the one or more fasteners may comprise two fasteners that extend from opposing corners of the cover portion at a 45-degree angle.

In some embodiments, each of the one or more fasteners may comprise a strap and a fastening component.

In some embodiments, the one or more fasteners may comprise two fasteners, and the fastening components of the two fasteners may interconnect to support the cover portion from the portion of the vehicle.

In some embodiments, at least one of the one or more fasteners may include a fastening component that is configured to attach to a window of the vehicle.

In some embodiments, at least one of the one or more fasteners may include a fastening component that is configured to attach to a handle of the vehicle.

In some embodiments, at least one of the one or more fasteners may include a fastening component that is configured to attach to a headrest of the vehicle.

In some embodiments, the cover portion may include a stiffening member.

In some embodiments, the present invention may be implemented as a vehicle protection system that includes a vehicle seat cover and a vehicle door guard. The vehicle seat cover may comprise a lower portion that is configured to protect a seat portion of a vehicle seat and an upper portion that is configured to protect a back portion of the vehicle seat. The vehicle door guard may comprise a cover portion that is configured to be secured to the lower portion of the vehicle seat cover and one or more fasteners that are configured to support the cover portion from a portion of the vehicle.

In some embodiments, the cover portion may be configured to be secured to an underside of the lower portion of the vehicle seat cover.

In some embodiments, the one or more fasteners may be configured to support the cover portion from a window, a handle, or a headrest of the vehicle.

In some embodiments, the vehicle seat cover may comprise a front portion that is configured to protect a back portion of a frontward vehicle seat.

In some embodiments, the one or more fasteners may comprise opposing fasteners that extend from top corners of the cover portion, and the cover portion may further comprise a stiffening member that extends between the opposing fasteners.

In some embodiments, the present invention may be implemented as a vehicle door guard that includes a cover portion and one or more fasteners. The cover portion may have a top and a bottom and may be configured to attach to a lower portion of a vehicle seat cover when the vehicle seat cover is installed on a seat portion of a vehicle seat in a vehicle. The one or more fasteners may extend from the cover portion and may be configured to support the cover portion from a portion of the vehicle while the cover portion is secured to the lower portion of the vehicle seat cover to thereby position the cover portion over a door of the vehicle.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "vehicle seat" should be construed as encompassing a bench seat, one or more bucket seats, and other types of vehicle seats. A vehicle seat may be configured to fold and may have multiple sections (e.g., in the case of a bench seat). A vehicle seat will be described as having a seat portion, which is the generally horizontal portion on which an individual may sit, and a back portion, which is the generally vertical portion against which an individual may support his or her back. A "vehicle seat cover" should be construed as an article that covers a vehicle seat. For example, a vehicle seat cover may cover only the seat portion of a vehicle seat or both the seat portion and the back portion of a vehicle seat. Also, as described below, a vehicle seat cover may cover the seat portion and back portion of a rearward seat and a rear side of a back portion of a frontward seat. A vehicle seat cover may also be configured to cover a vehicle seat when the seat portion is folded up such as when the rear seat(s) of a crew cab are folded up. In such cases, the vehicle seat cover could also cover a rear side of a back portion of a frontward seat. A vehicle door guard configured in accordance with embodiments of the present invention can be used with a wide variety of vehicle seat covers to provide protection to a vehicle door and other portions of the vehicle that are positioned to the side of a vehicle seat (e.g., the trim surrounding the door).

Figure 1A:
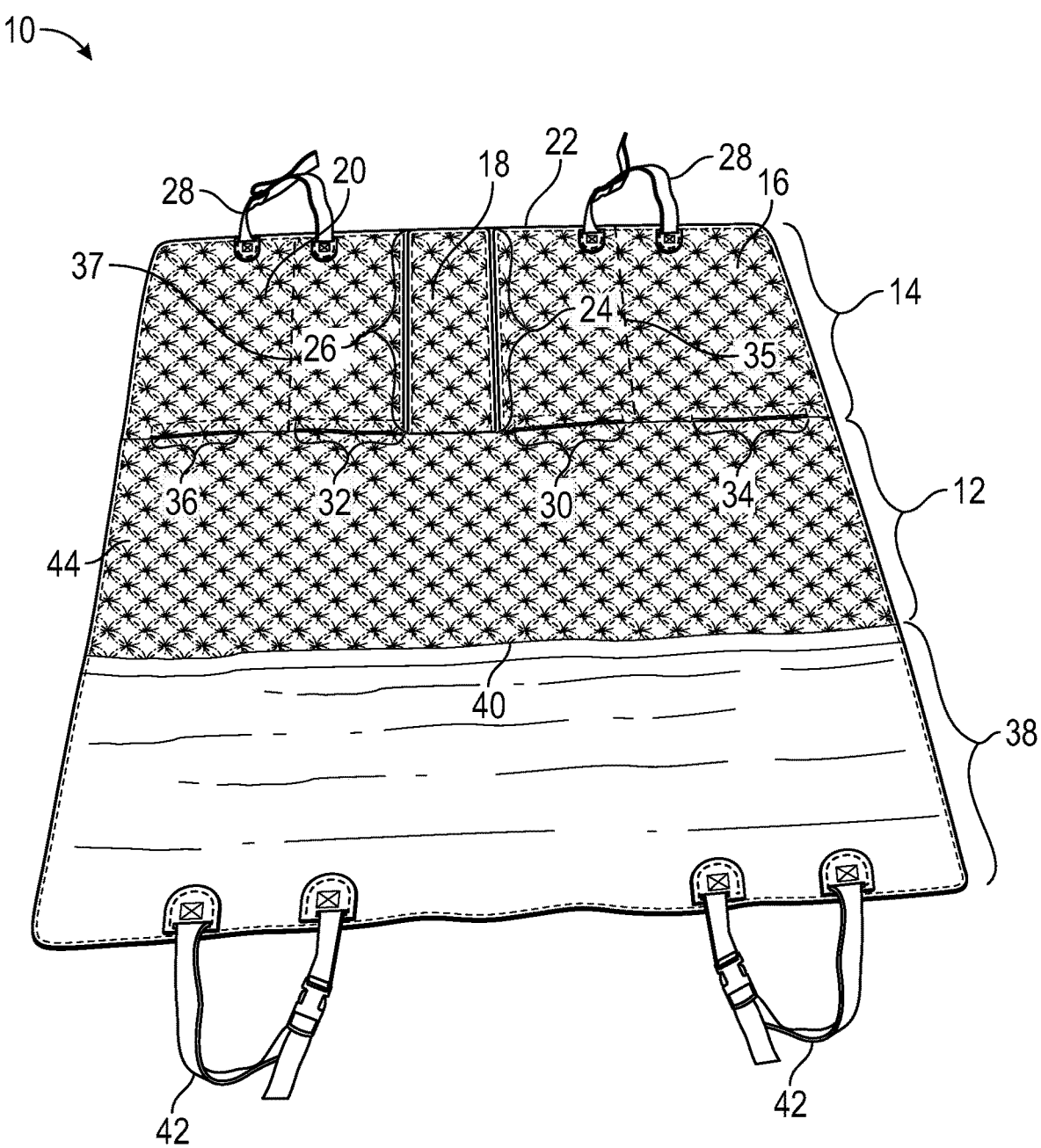
FIG. 1A provides an example of a vehicle seat cover with which a vehicle door guard can be used in accordance with one or more embodiments of the present invention.
Figure 1B:
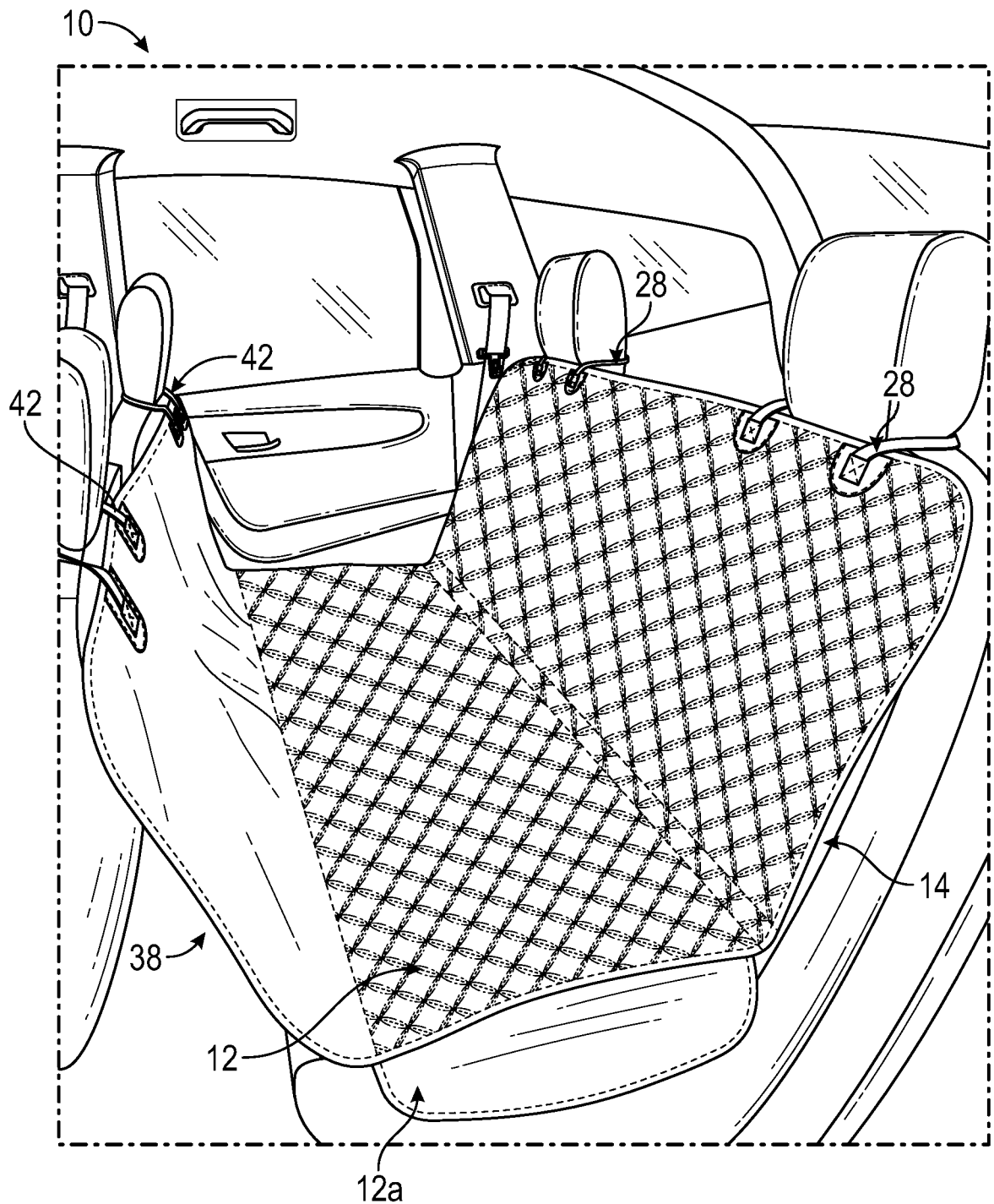
FIG. 1B provides an example of how the vehicle seat cover of FIG. 1A can be used to protect seats of a vehicle.

FIGS. 1A and 1B provide an example of a vehicle seat cover 10 (or simply cover 10) with which a vehicle door guard could be used. Cover 10 includes a lower portion 12 that is configured to cover the seat portion of a vehicle seat, an upper portion 14 that is coupled to lower portion 12 and configured to cover the back portion of the vehicle seat, and a front portion 38 that extends from a front edge 40 of lower portion 12 and is configured to cover the rear side of a back portion of another vehicle seat (e.g., the front seat(s)). As shown in FIG. 1B, lower portion 12, upper portion 14, and front portion 38 cause cover 10 to resemble a hammock when installed.

Upper portion 14 may include one or more fasteners 28 that are configured to secure/support upper portion 14 to/from the vehicle seat (e.g., by wrapping around the headrests of the rear or middle bench seat). Similarly, front portion 38 may include one or more fasteners 42 that are configured to secure/support front portion 38 to/from the other vehicle seat (e.g., by wrapping around the headrests of the front bucket seats/bench). Fasteners 28 and 42 could be in any suitable form such as straps with buckles, hook and loop, magnets, etc.

Lower portion 12 can have a width that corresponds with the width of the vehicle seat (e.g., to extend across the entirety of the seat portion). In some embodiments, lower portion 12 can include extensions 12a that extend outwardly from the sides of lower portion 12 and are configured to extend downwardly overtop the sides of the seat portion. In contrast, in some embodiments, lower portion 12 may not include extensions 12a.

Upper portion 14 may also have a width that corresponds with the width of the vehicle seat (e.g., to extend across the entirety of the back portion). In some embodiments, upper portion 14 may include one or more vertical slits that enable portions of the vehicle seat to be folded when upper portion 14 is installed. For example, in FIG. 1A, vertical slits 24 and 26 extend downwardly from an upper edge 22 of upper portion 14 and divide upper portion 14 into sections 16, 18, and 20 which may generally match the sections of the vehicle seat on which cover 10 is intended to be used.

Openings 30, 32, 34, and 36 may be formed between upper portion 14 and lower portion 12 to allow seat belts to pass through. In some embodiments, vertical slits 24 and 26 may extend to openings 30 and 32 respectively to allow sections 16 and 20 to be folded back along fold lines 35 and 37 respectively. In this way, upper portion 14 can accommodate vehicle seats with different folding configurations.

Figure 2:
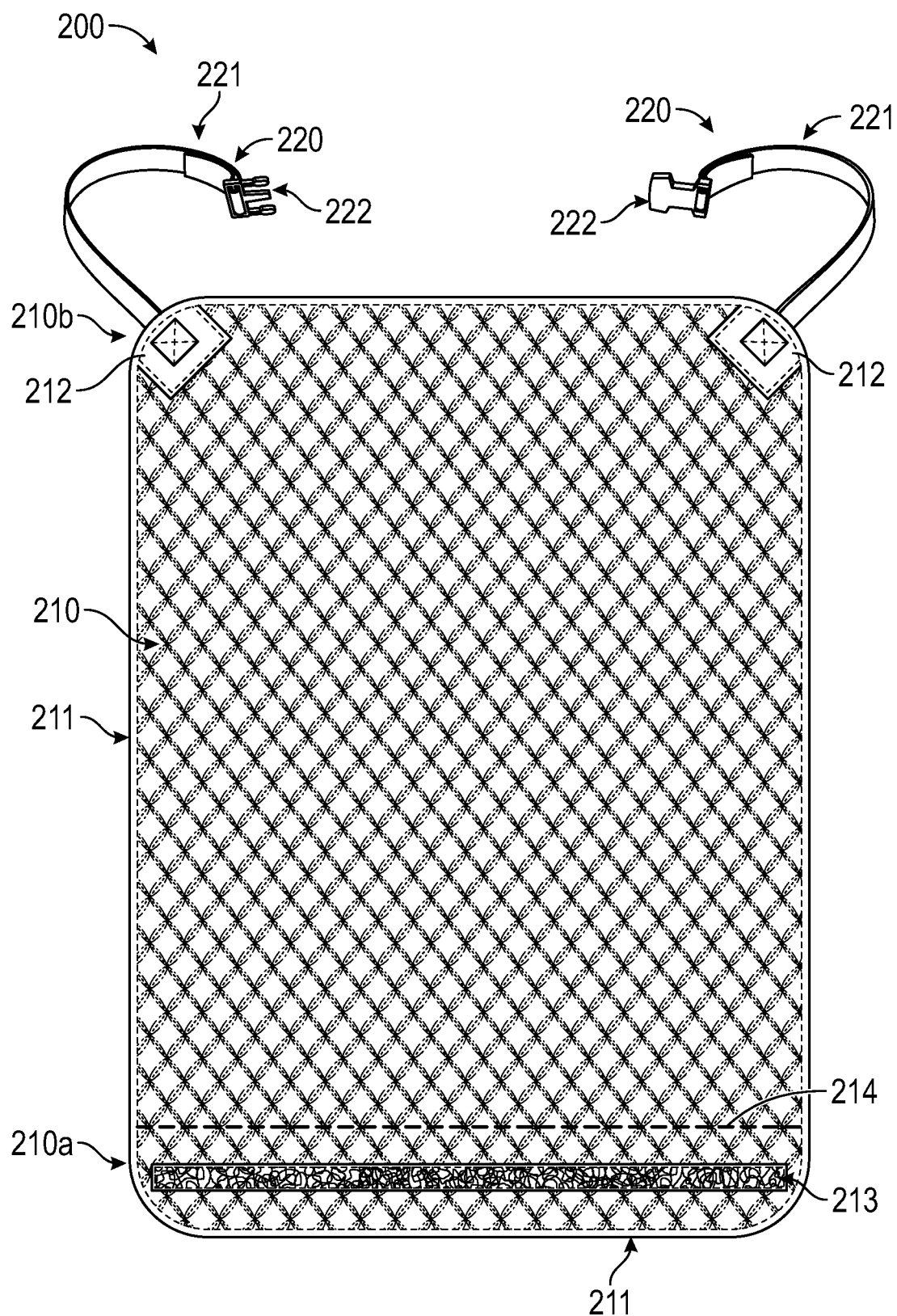
FIG. 2 provides an example of a vehicle door guard that is configured in accordance with embodiments of the present invention.

FIG. 2 provides an example of a vehicle door guard 200 (or guard 200) that is configured in accordance with one or more embodiments of the present invention. Guard 200 includes a cover portion 210 that may be made of one or more layers of a fabric material and that is configured to cover at least a portion of a vehicle door while being secured to a vehicle seat cover such as cover 10. In some embodiments, an edge 211 may extend around cover portion 210. In some embodiments, including the depicted embodiments, cover portion 210 may have a rectangular shape. However, a cover portion 210 may have different shapes and sizes such as based on the type of vehicle with which it is intended to be used. For example, cover portion 210 may have a width that generally corresponds with the width of lower portion 12 and a height that is sufficient to ensure that cover portion 210 extends up to and possibly beyond the window of the vehicle's door when cover portion 210 is secured to lower portion 12.

For example, a fastening strip 213 may be formed at or towards a bottom 210a of cover portion 210. In some embodiments, fastening strip 213 may be hook and loop material, an adhesive material, a magnetic material, a zipper, one or more buttons, etc. Fastening strip 213 may extend across all or a portion of bottom 210a and be configured to secure to a corresponding fastening strip formed on/in the lower portion of a vehicle seat cover. A fold line 214 may be formed towards bottom 210a to facilitate securing fastening strip 213 to the lower portion of the vehicle seat cover such as by folding bottom 210a underneath the lower portion.

Additionally, one or more fasteners 220 may be formed at or towards a top 210b of cover portion 210. In the depicted example, opposing fasteners 220 extend at a 45-degree angle from the corners of top 210b. However, a fastener 220 could extend from any portion of top 210*b*. For example, a single fastener 220 could extend upwardly from a center of top 210*b*.

Fasteners 220 could be formed of straps 221 (or other elongated material) and may be secured at one end to cover portion 210. In some embodiments, a reinforced section 212 may be formed on cover portion 210 and straps 221 may be secured to cover portion 210 at a reinforced section 212. Each fastener 220 may also include a fastening component 222 that is configured to enable the corresponding strap 221 to be fastened to the other strap 221 and/or to be coupled to a portion of the vehicle. For example, in FIG. 2, fastening components 222 are interlocking components of a buckle. In other embodiments, a fastening component 222 could be or include a suction cup for attaching strap 221 to the window, could form a buckle or other mechanical or magnetic structure for securing a strap 221 around a headrest, a handle, or other portion of the vehicle, a clip for supporting a strap 221 from the top of the window or other upwardly oriented portion of the vehicle, etc.

Figure 3:
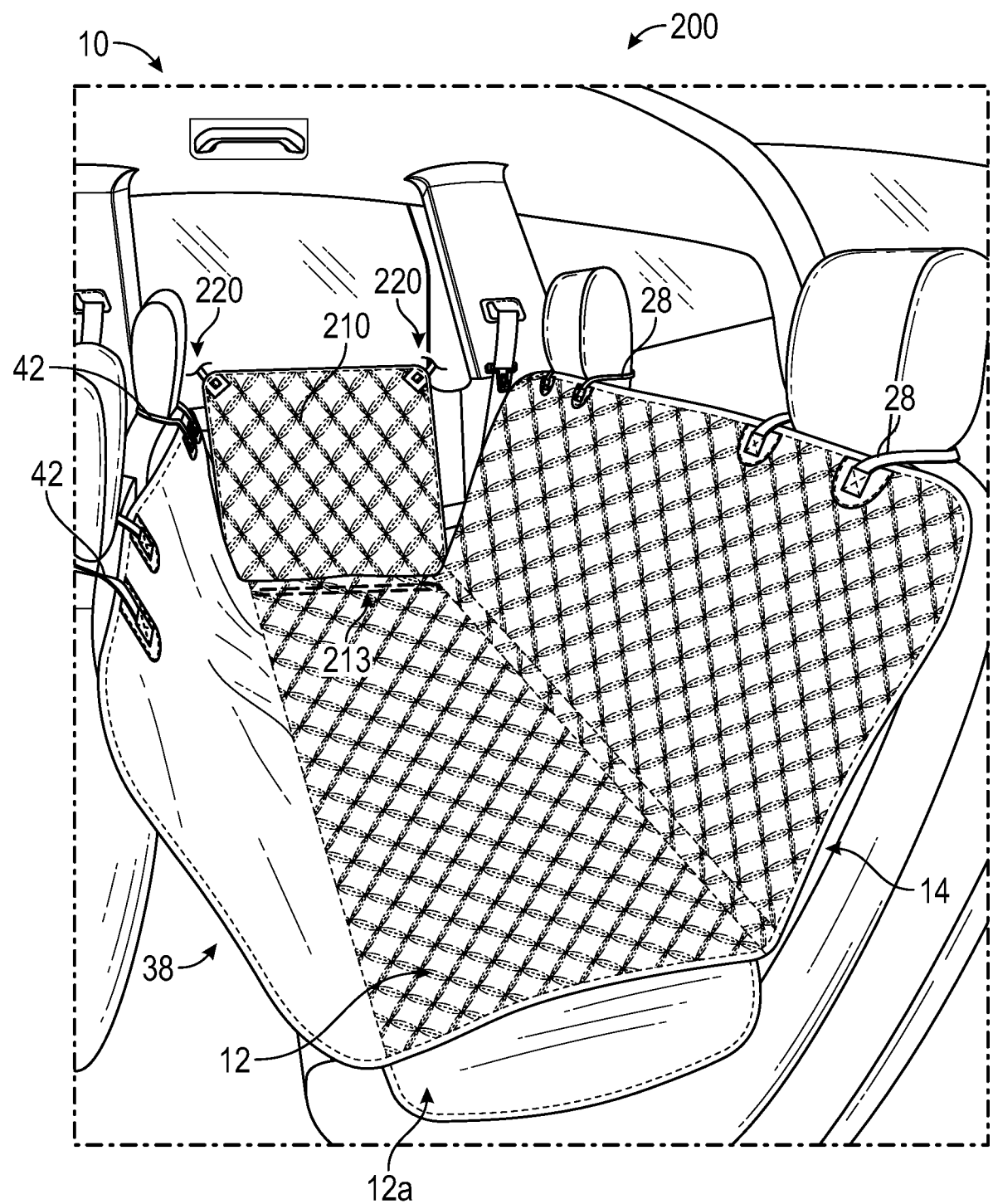
FIG. 3 provides an example of how the vehicle door guard of FIG. 2 can be used in conjunction with the vehicle seat cover of FIG. 1B.

FIG. 3 provides an example of how cover portion 210 may be used in conjunction with cover 10 to protect a vehicle door. As shown, bottom 210*a* of cover portion 210 can be positioned underneath lower portion 12 of cover 10 and secured thereto via fastening strip 213. For example, if fastening strip 213 is hook and loop material, corresponding hook and loop material could be included on the underside of lower portion 12. Alternatively, corresponding hook and loop material could be included on extension 12*a*. By employing fastening strip 213 to secure cover portion 210 to lower portion 12, no gaps will exist between lower portion 12 and cover portion 210. This can minimize the likelihood of objects falling between the vehicle seat and the door.

FIG. 3 also generally represents that fasteners 220 can be used to maintain cover portion 210 in a generally vertical orientation while bottom 210*a* remains secured to lower portion 12. In this way, cover portion 210 can protect the door and other areas to the side of the vehicle seat. For example, top 210*b* is positioned above the bottom of the window and the sides of cover portion 210 extend substantially across the gap between the back portions of the front and rear seats.

Figure 3A:
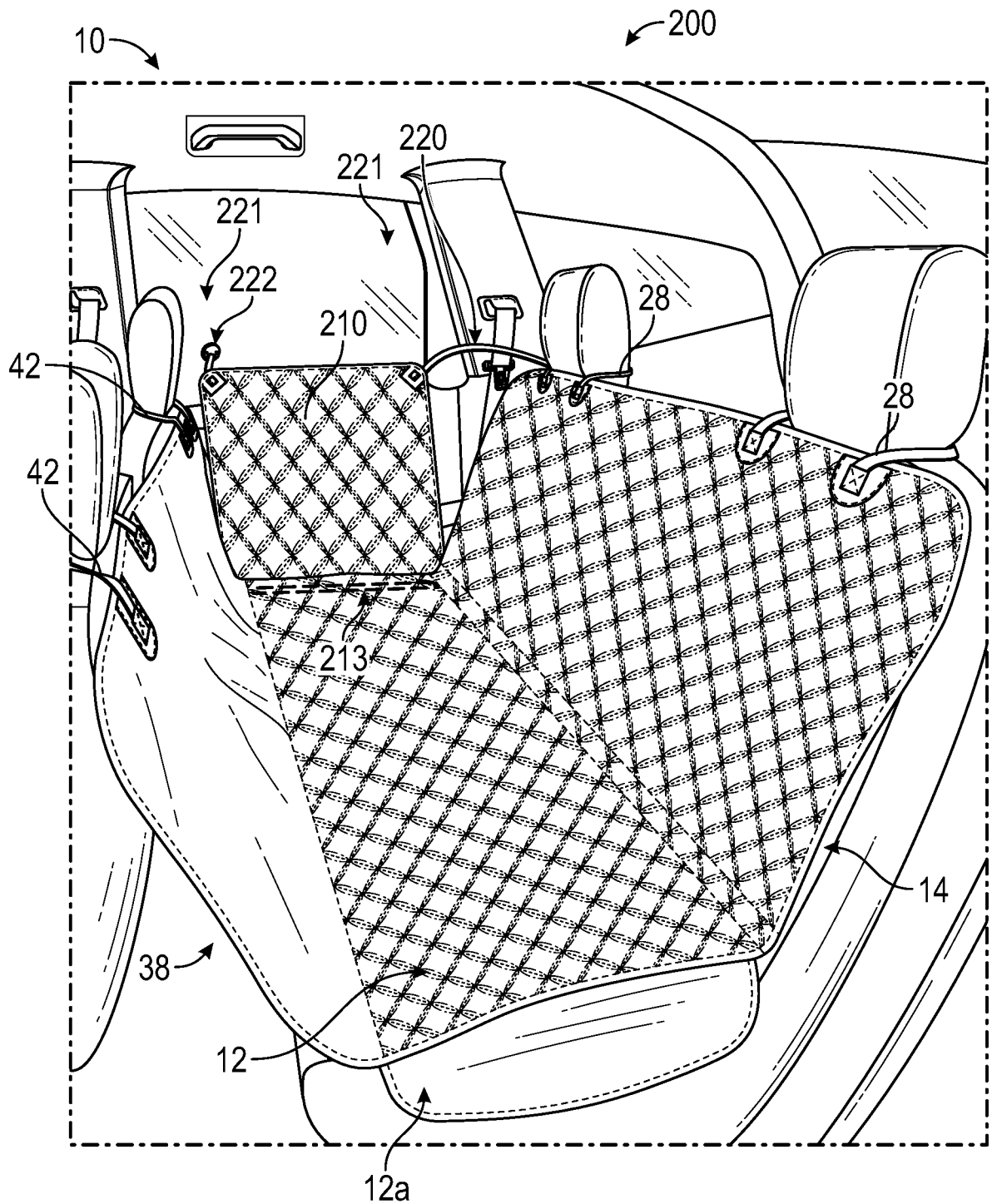
FIG. 3A provides examples of how the vehicle door guard of FIG. 2 can be secured.

FIG. 3A provides examples of how fasteners 220 can be used to support cover portion 210. A frontward fastener 220 includes a fastening component 222 in the form of a suction cup that is attached to the window. A rearward fastener 220 includes a fastening component 222 in the form of a buckle or clip that secures strap 221 around the headrest of the rear seat. In this configuration (i.e., with the frontward fastener 220 secured towards the front of the window and the rearward fastener 220 not secured to the door), the door could be opened without removing guard 200, or more specifically, without disconnecting fasteners 220 or fastening strip 213.

Figure 3B:
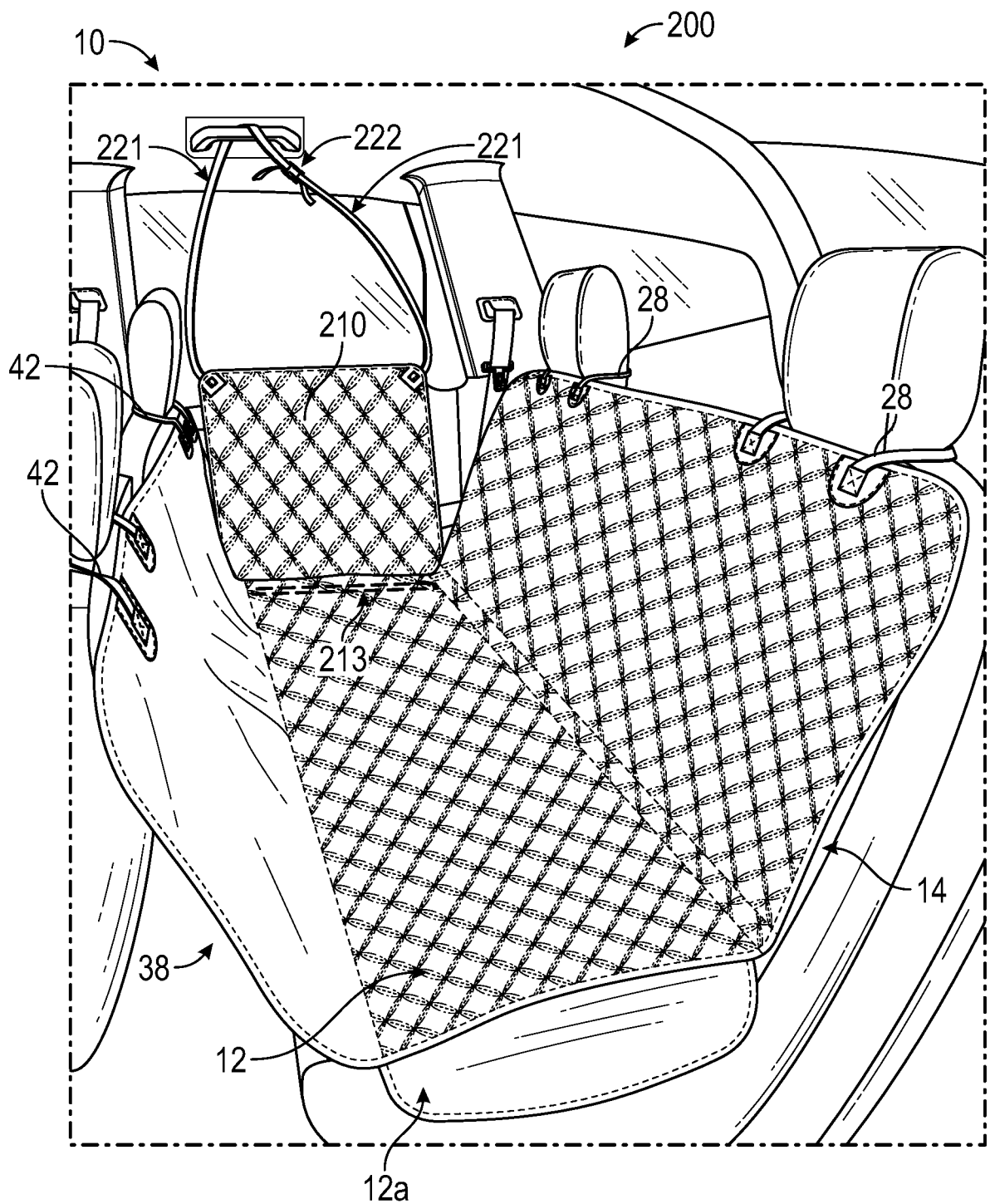
FIG. 3B provides additional examples of how the vehicle door guard of FIG. 2 can be secured.

FIG. 3B provides an example where fasteners 220 are used to support cover portion 210 from the handle above the door. For example, fastening components 222 could form a buckle to allow straps 221 to be looped through the handle. In this example, the door could also be opened without removing guard 200. This configuration could also be accomplished with a single fastener 220 such as by using a fastening component 222 in the form of a clip or hook that attaches to the handle.

Figure 4:
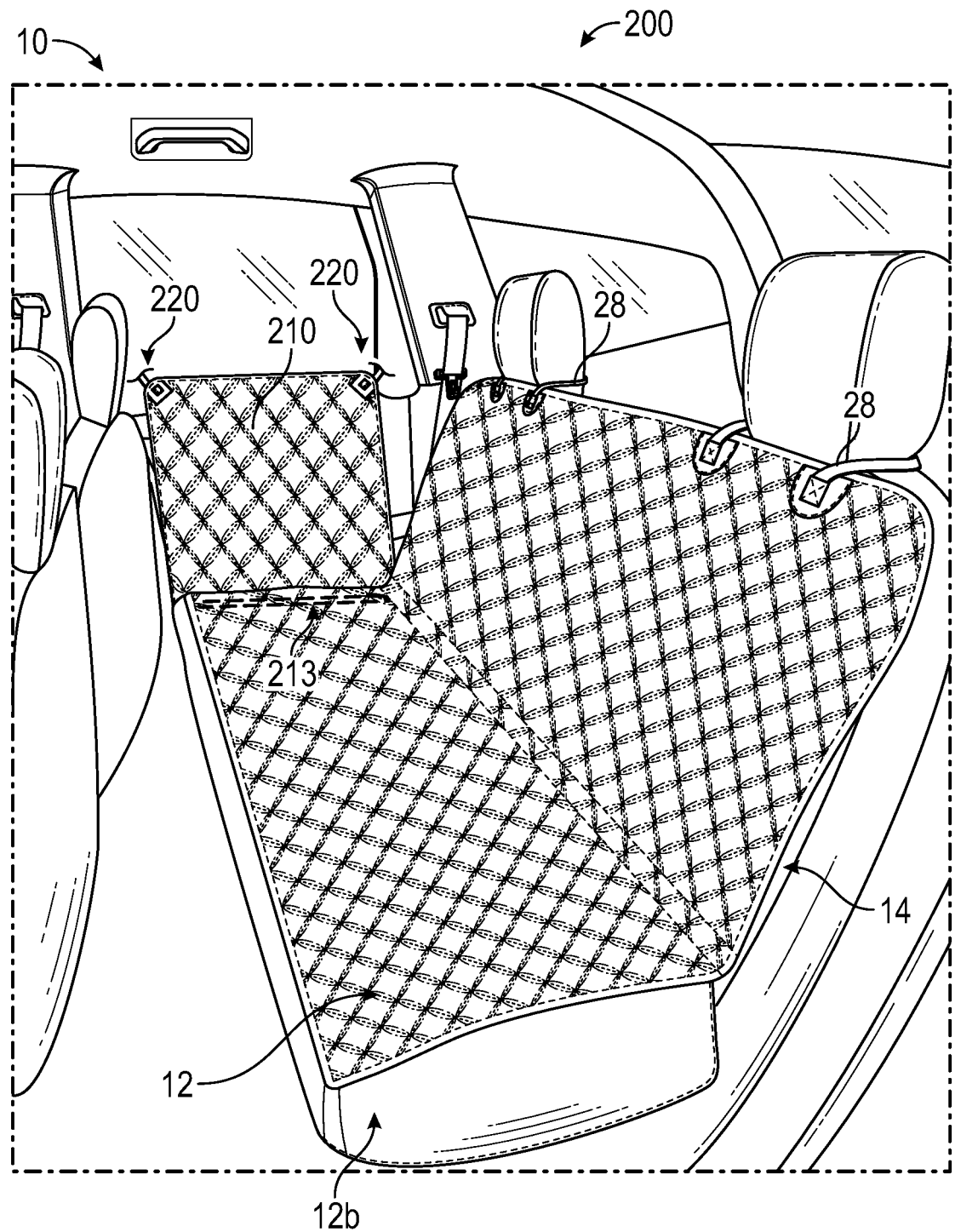
FIG. 4 provides an example of how the vehicle door guard of FIG. 2 can be used in conjunction with another vehicle seat cover.

FIG. 4 provides an example of how guard 200 may be used in conjunction with a vehicle seat cover 10*a* (or simply cover 10*a*) that does not include a front portion 38. To the contrary, cover 10*a* includes a skirt 12*b* that extends around lower portion 12. As with cover 10, bottom 210*a* of cover portion 210 can be secured to lower portion 12 of cover 10*a* and fastener(s) 220 can be used to secure cover portion 210 to a portion of the vehicle.

Figure 5A:
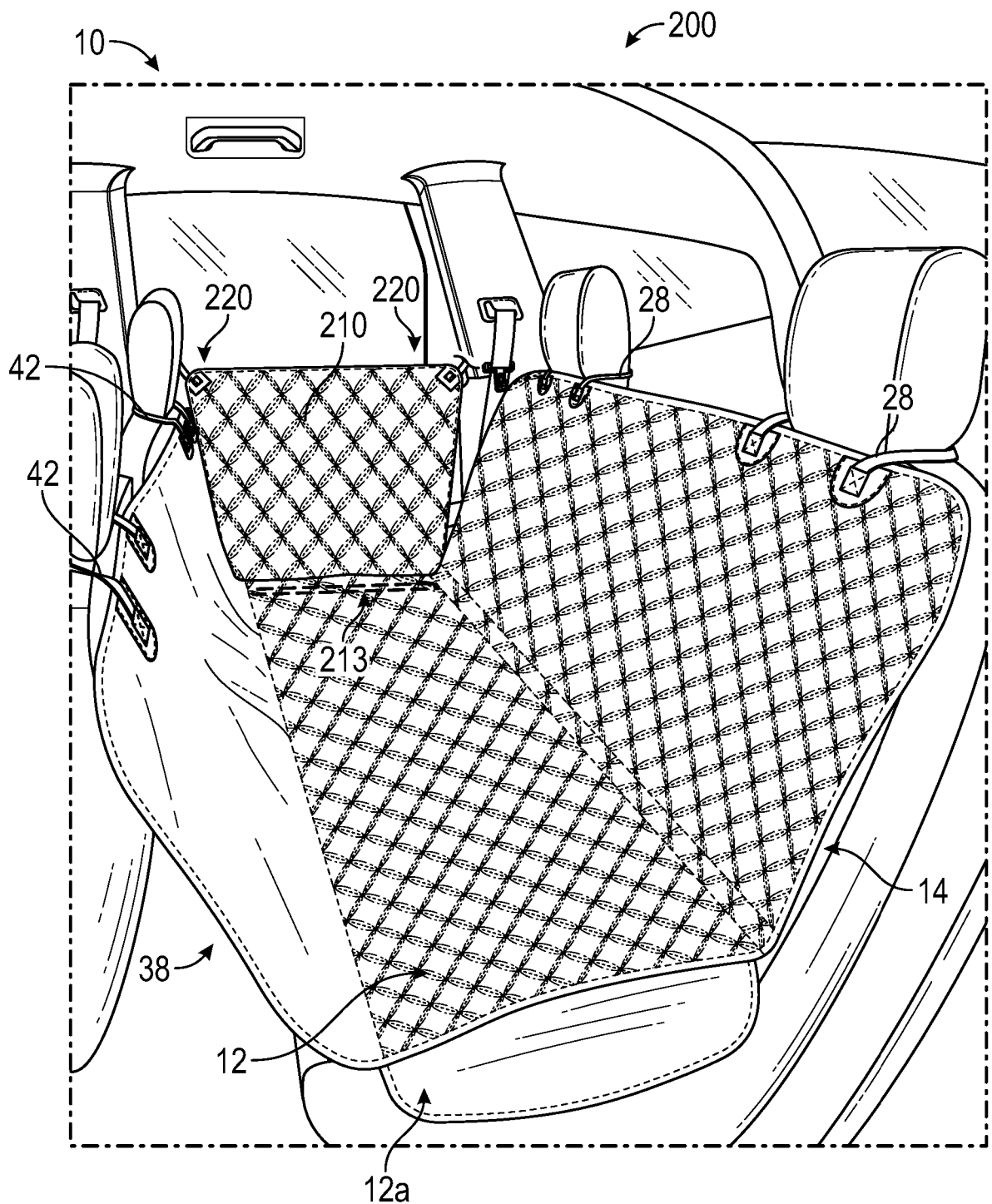
FIGS. 5A-5C each provide another example of a vehicle door guard that can be used in conjunction with a vehicle seat cover.
Figure 5B:
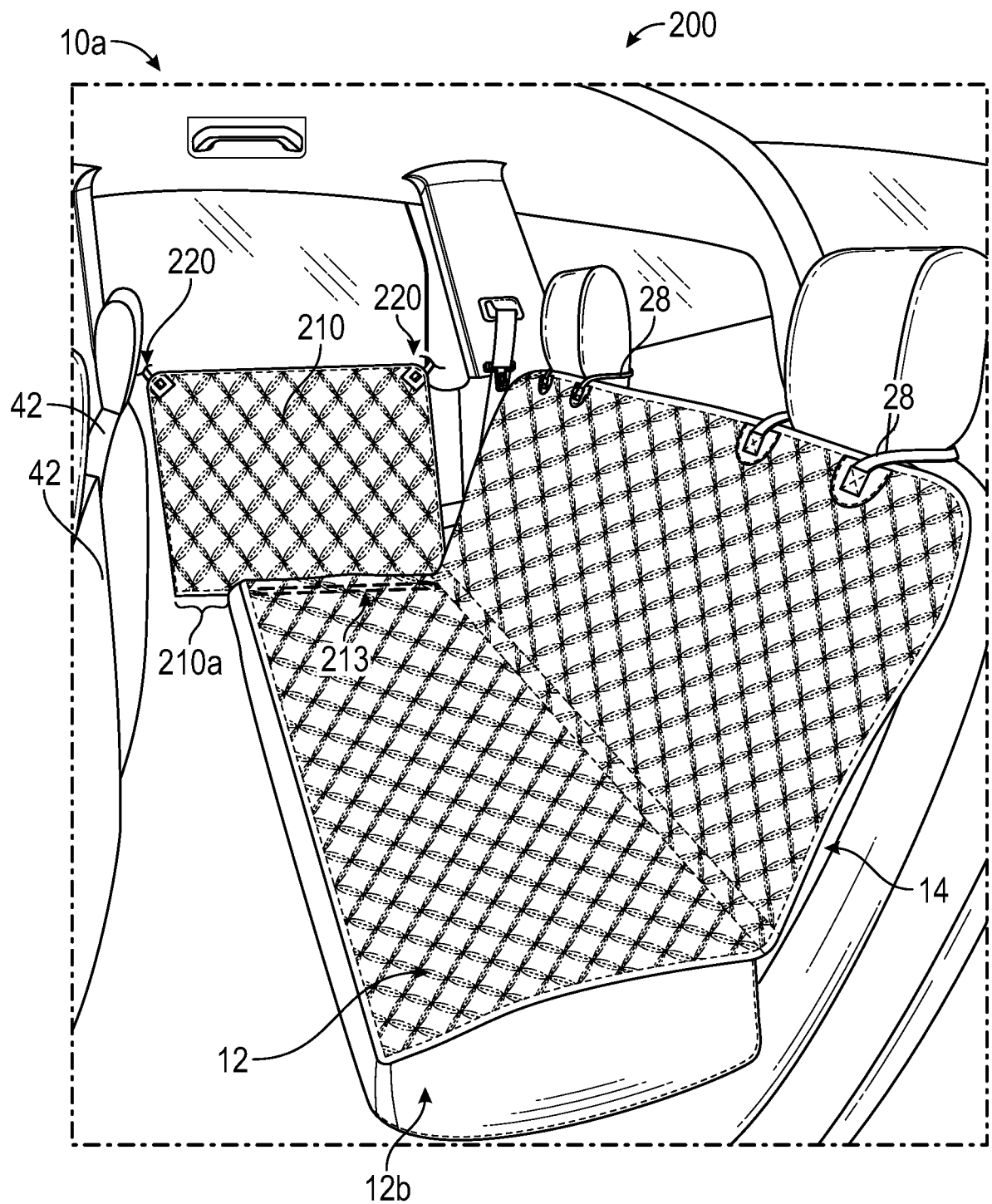
Figure 5C:
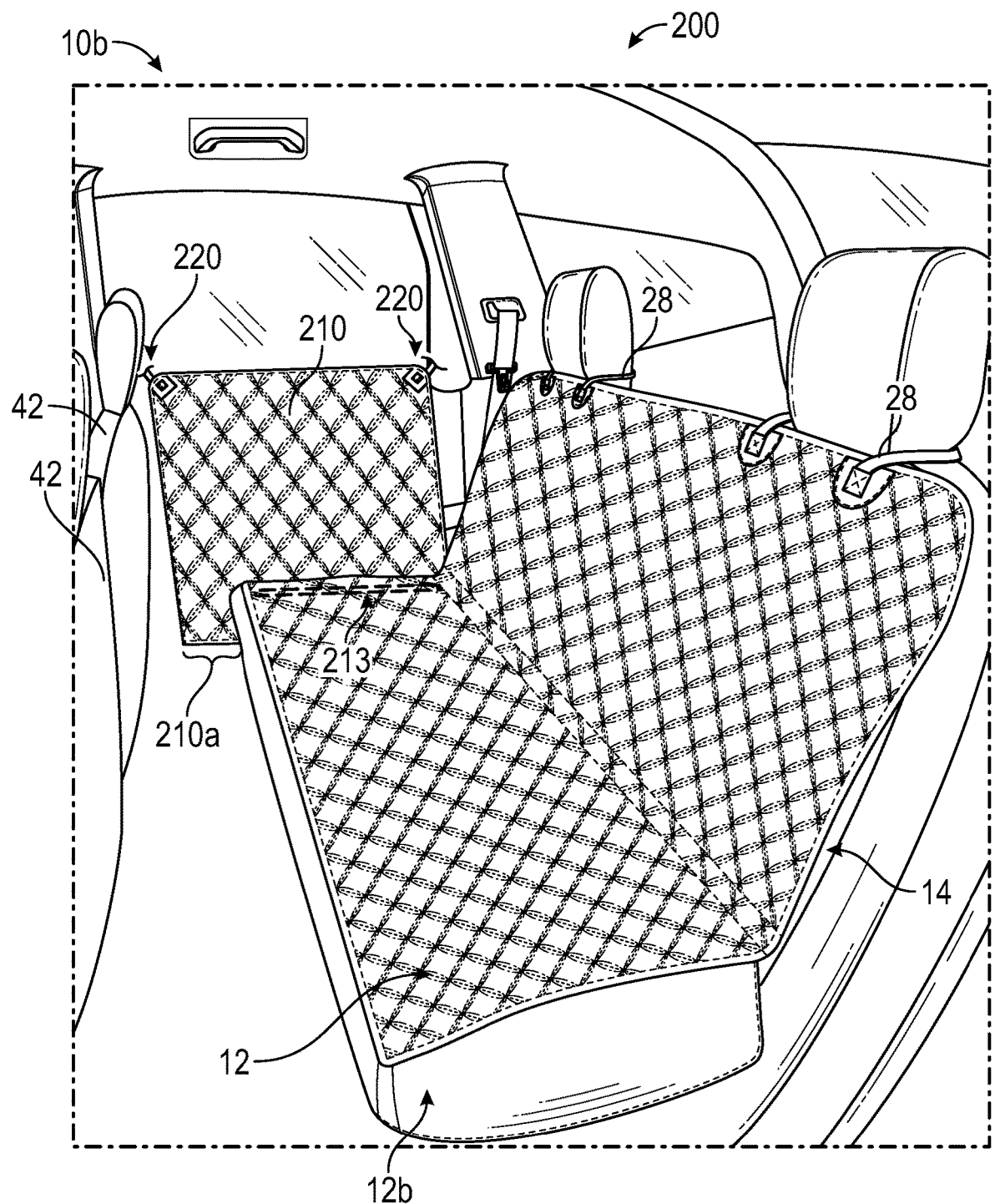

FIGS. 5A-5C provide examples where cover portion 210 of guard 200 has a different shape. In FIG. 5A, which otherwise matches FIG. 3, cover portion 210 is wider at top 210*b* than at bottom 210*a* such that cover portion 210 has a trapezoidal shape. For example, the side of cover portion 210 towards the rear may more closely align with the angle of the back portion of the rear seat.

In FIG. 5B, which otherwise matches FIG. 4, the width of cover portion 210 is greater than the width/depth of lower portion 12. Therefore, a portion 510 of cover portion 210 extends frontwardly beyond the seat portion of the vehicle seat. Such configurations may be beneficial when guard 200 is used with a cover, such as cover 10*a*, that does not include front portion 38 because guard 200 can protect frontward portions of the door.

FIG. 5C matches FIG. 5B except that portion 510 also extends further downwardly. In other words, portion 510, which extends frontwardly beyond the seat portion of the vehicle seat, can also extend downwardly beyond the portion of cover portion 210 that is secured to lower portion 12 (e.g., the portion on which fastening strip 213 is positioned). Such configurations can be used to extend protection to the bottom of the door or otherwise towards the floor of the vehicle.

Figure 6:
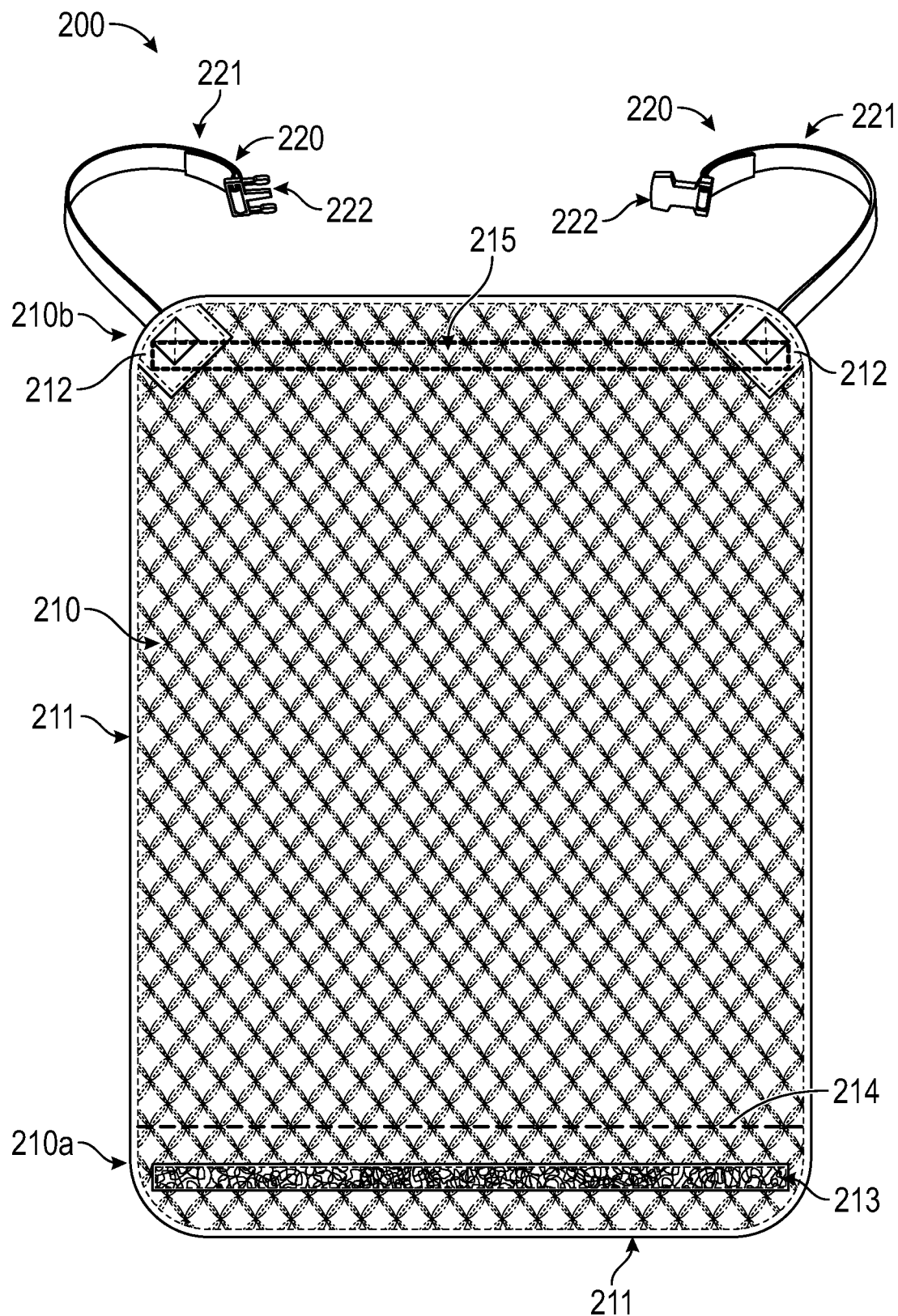
FIG. 6 provides an example of a vehicle door guard that includes a reinforcement structure.

In some embodiments, guard 200 may include a stiffening member to maintain cover portion 210 in a planar orientation. For example, in FIG. 6, a stiffening member 215 is incorporated into cover portion 210 and extends between reinforced sections 212. Stiffening member 215 can ensure that top 210*b* remains planar regardless of how fasteners 220 may be used to support cover portion 210. Stiffening member 215 could be formed of a metal or plastic bar or any elongated rigid or semi-rigid material. Stiffening member 215 could be formed inside layers of cover portion 210 or may extend along the front or rear surface of cover portion 210. A stiffening member could also be integrated into cover portion 210 at other locations (e.g., at a midpoint between bottom 210*a* and top 210*b*).

In some embodiments, the rear side of cover portion 210 (i.e., the side that is configured to face the door) may be formed of a non-slip material. This non-slip material could minimize movement of cover portion 210 relative to the door such as when a pet may lean on or otherwise contact cover portion 210.

In some embodiments, a vehicle door guard may be a component of a vehicle seat cover. For example, cover 10 and one or more guards 200 could be provided as a vehicle protection system.

Figure 7:
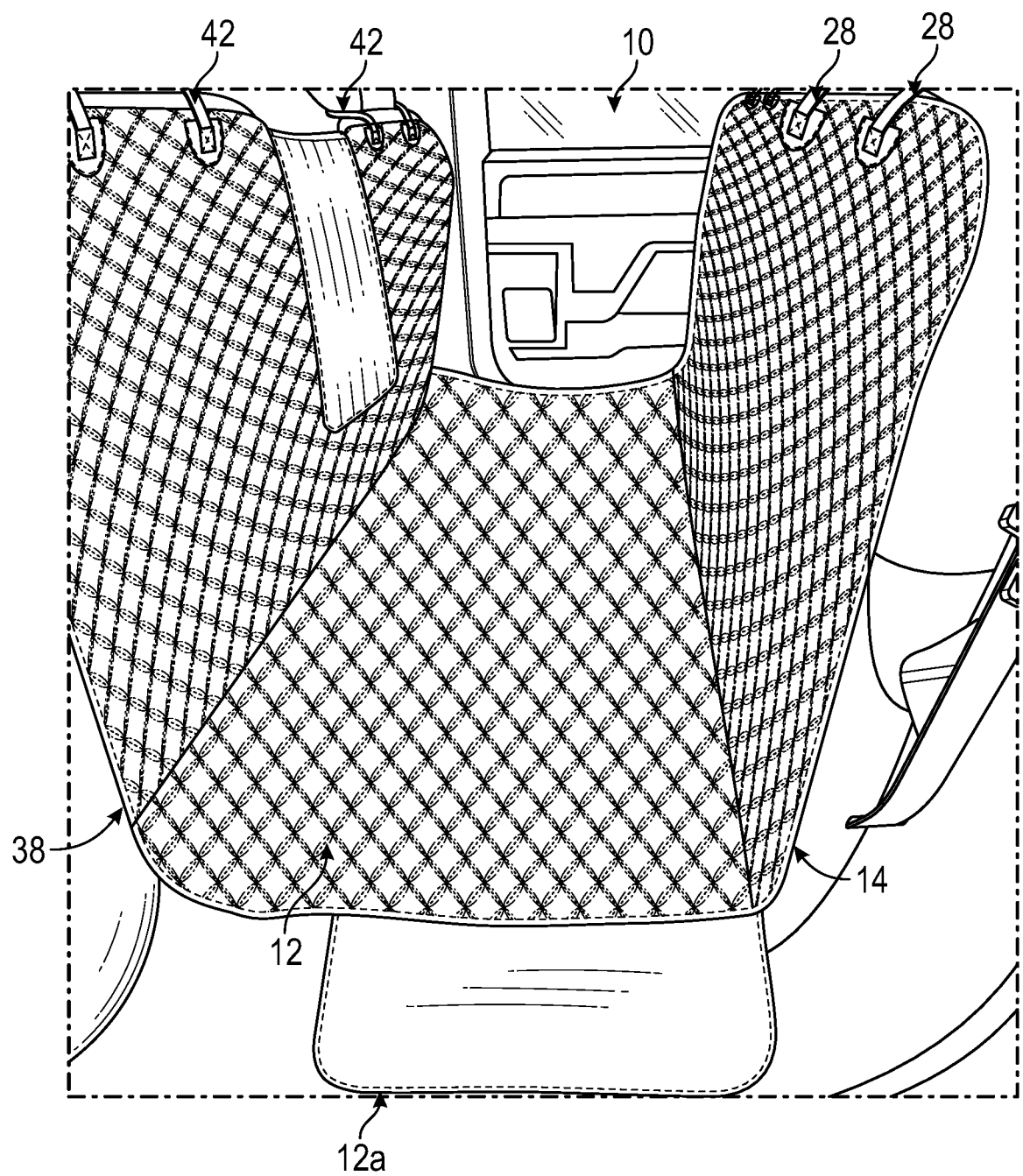
FIG. 7 provides an example of another vehicle seat guard with which a vehicle door guard can be used.

FIG. 7 provides an example of a vehicle seat cover 10*b* (or simply cover 10*b*) that is substantially the same as cover 10 but is designed for use when the seat portion is folded up. As shown, cover 10*b* includes upper portion 14, lower portion 12, and front portion 38, but upper portion 14 covers the folded-up seat portion and rear portion of the rearward vehicle seat and lower portion 12 may rest on the floor between the rearward seat and the frontward seat.

Figure 8A:
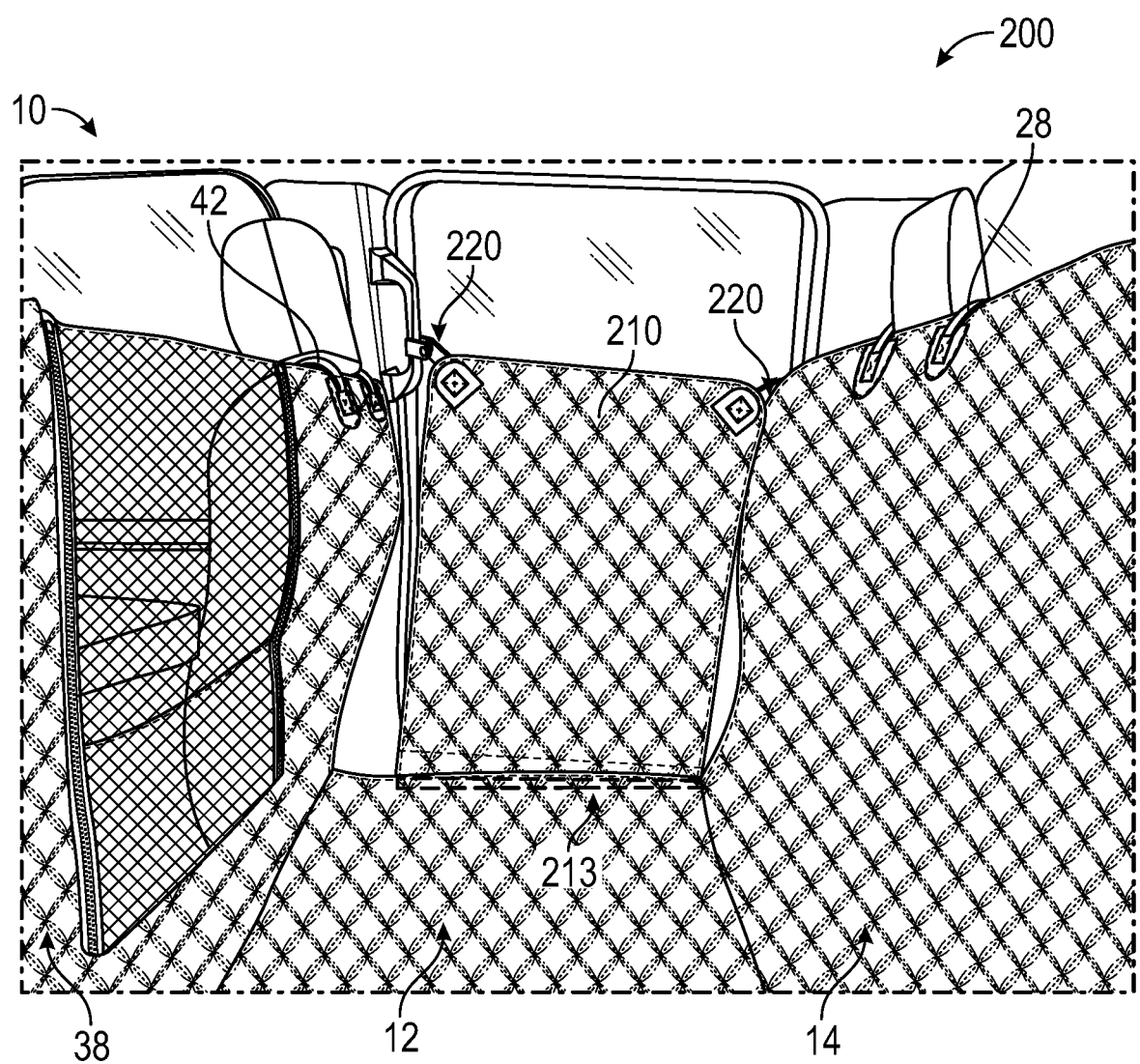
FIGS. 8A and 8B provide examples of how a vehicle door guard can be used with the vehicle seat guard of FIG. 7.
Figure 8B:
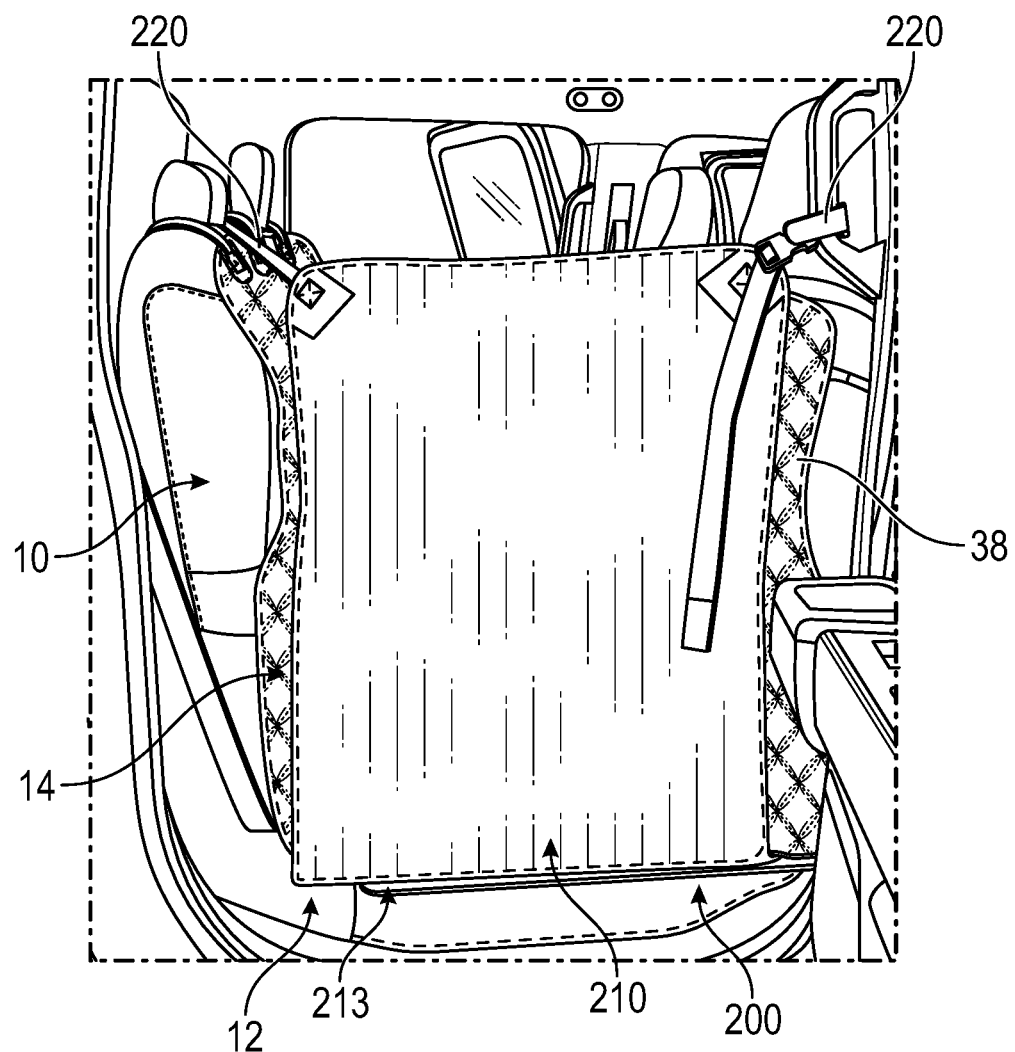

FIG. 8A, which is a view from inside the vehicle, and FIG. 8B, which is a view from outside the vehicle with the door open, provide an example of how door guard 200 can be used with cover 10*b*. In this example, a front fastener 220 is used to support door guard 200 from a handle along the front side of the window and a rear fastener 220 is used to support door guard from a headrest of the rearward seat.

Figure 9:
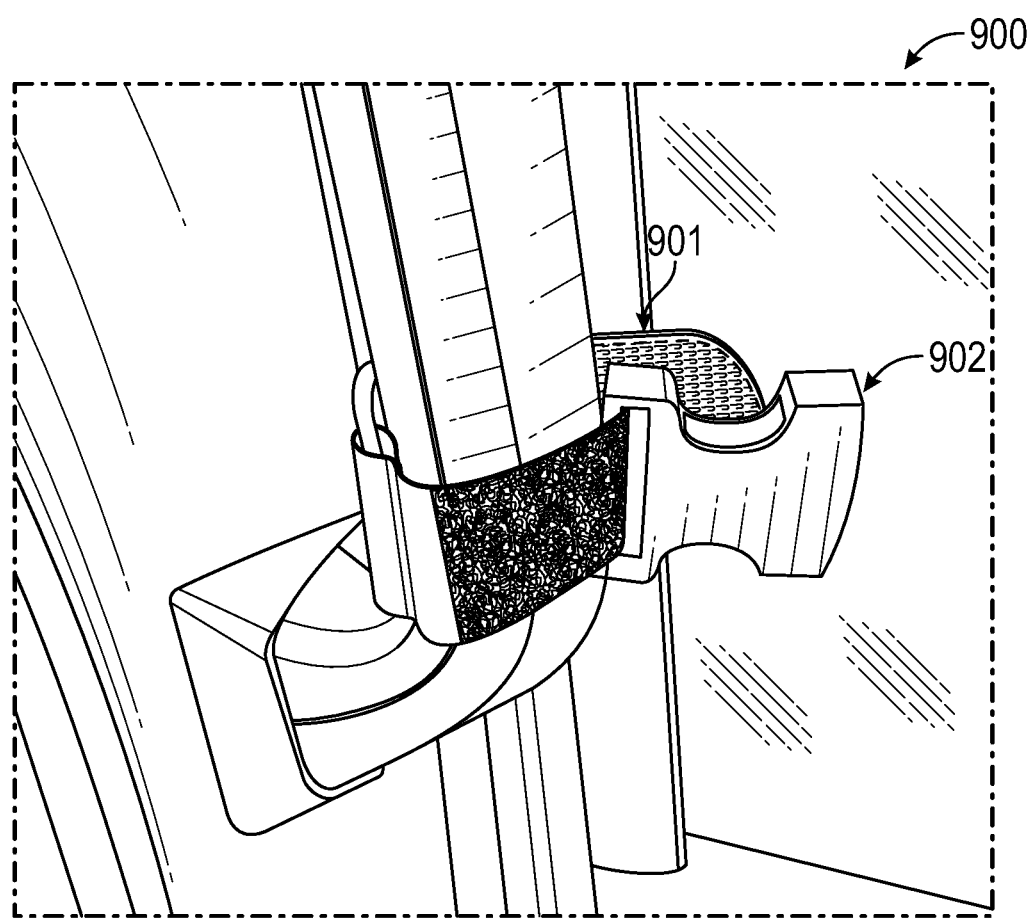
FIG. 9 provides an example of a fastener that could be used to support a vehicle door guard.

FIG. 9 provides an example of a fastener 900 that could be used with fastener 220. Fastener 900 includes an adjustable strap 901 that may be selectively secured around a component of the vehicle such as a handle. For example, strap 901 could include hook and loop material to allow it to be tightened around handles or other components of various sizes. Fastener 900 may also include a fastening component 902 that corresponds with fastening component 222. Accordingly, fastening component 222 can be coupled to fastening component 902 to support door guard 200 from any component to which fastener 900 may be secured.

Figure 10:
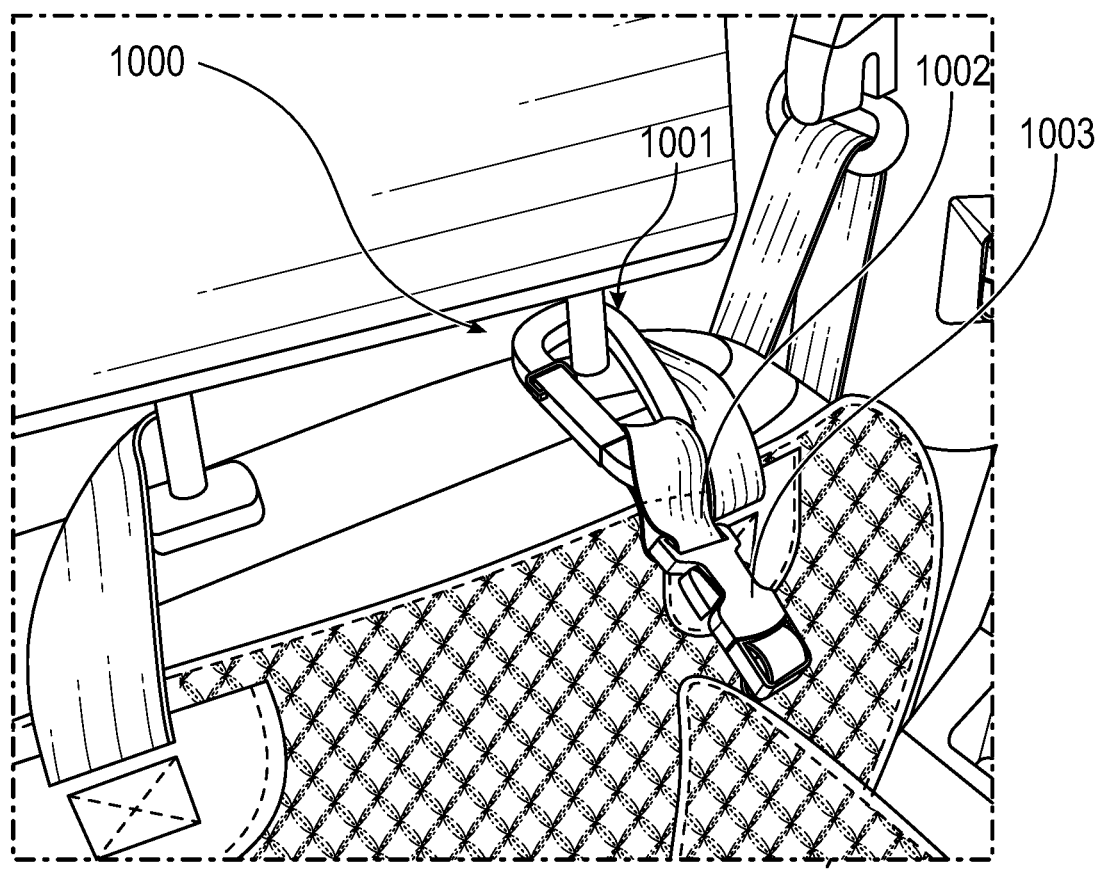
FIG. 10 provides an example of another fastener that could be used to support a vehicle door guard.

FIG. 10 provides an example of a fastener 1000 that could be used with fastener 220. Fastener 1000 includes a hooking member 1001 (e.g., a carabiner, quick link, hook, etc.) that can be secured to a headrest or other component of the vehicle. An adjustable strap 1002 can be secured between hooking member 1001 and a fastening component 1003. Fastening component 1003 can correspond with fastening component 222 so that door guard can be supported from any component to which fastener 1000 may be secured.

In summary, a vehicle door guard can be configured to be secured to a lower portion of a car seat cover and to one or more portions of the vehicle to thereby extend protection to the door and/or portions of the vehicle to the side of a vehicle seat. The vehicle door guard can eliminate any gap to the side of the vehicle seat to thereby block objects from falling between the vehicle seat and door. The vehicle door guard may also be quickly detached from the vehicle seat cover if desired but need not be removed to open and close the door. Accordingly, a vehicle door guard can provide additional protection when a dog or other pet is transported in a vehicle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A vehicle door guard configured to cover and protect at least a portion of a door, the door guard comprising:
a cover portion having a top and a bottom, the cover portion including a fastening strip that is positioned towards the bottom, the fastening strip being configured to selectively secure the cover portion to an underside of a lower portion of a vehicle seat cover when the vehicle seat cover is installed on a vehicle seat in a vehicle, the underside of the lower portion of the vehicle seat cover being configured to face an upholstery of the vehicle when the vehicle seat cover is installed on the vehicle seat, wherein the fastening strip is further configured to selectively detach from the underside of the lower portion of the vehicle seat cover, wherein when the fastening strip is detached from the underside of the lower portion of the vehicle seat cover, the bottom of the cover portion extends below the vehicle seat to protect a lower portion of a door disposed below the vehicle seat; and
one or more fasteners that extend from the cover portion, the one or more fasteners being configured to selectively support the cover portion from a portion of the vehicle and retain the cover portion in a substantially vertical orientation to protect a door of the vehicle when the door is closed, wherein the one or more fasteners are further configured to selectively retain the cover portion in the substantially vertical orientation when the door is open, thereby selectively providing a barrier between an interior and an exterior of the vehicle when the door is open, and wherein a top of the vehicle door guard includes an elongated bar extending from a first corner to a second corner, the elongated bar being configured to maintain the top of the vehicle door guard in a planar configuration.

2. The vehicle door guard of claim 1, wherein the fastening strip comprises at least one of: a hook and loop material, an adhesive material, and a magnetic material.

3. The vehicle door guard of claim 2, wherein the underside of the lower portion of the vehicle seat cover comprises a corresponding fastening strip extending across a width of the lower portion of the vehicle seat cover, wherein the fastening strip extends across a width of the cover portion, and wherein the fastening strip is configured to secure to the corresponding fastening strip along the width of the lower portion and the width of the cover portion.

4. The vehicle door guard of claim 1, wherein the cover portion includes a fold line towards the bottom, the fastening strip being positioned between the fold line and the bottom, wherein the fold line allows a folding portion of the cover portion to be selectively disposed in: (i) a substantially horizontal orientation such that the fastening strip can selectively couple the cover portion to the lower portion of the vehicle seat cover; and (ii) a substantially vertical orientation such that the cover portion extends downwardly past the lower portion of the vehicle seat cover.

5. The vehicle door guard of claim 1, wherein the one or more fasteners extend from the top of the cover portion or from a corner of the cover portion.

6. The vehicle door guard of claim 5, wherein the one or more fasteners comprise two fasteners that extend from opposing corners of the cover portion at a 45-degree angle.

7. The vehicle door guard of claim 1, wherein each of the one or more fasteners comprises a strap and a fastening component.

8. The vehicle door guard of claim 7, wherein the one or more fasteners comprise two fasteners, and wherein the fastening components of the two fasteners interconnect to support the cover portion from the portion of the vehicle.

9. The vehicle door guard of claim 1, wherein at least one of the one or more fasteners includes a fastening component that is configured to attach to at least one of a window of the vehicle, a handle of the vehicle, and a headrest of the vehicle.

10. The vehicle door guard of claim 1, wherein the top of the cover portion is stiff enough to be maintained in a planar orientation, whereas the bottom of the cover portion is flexible enough to fold.

11. A vehicle protection system comprising:
a vehicle seat cover comprising a lower portion that is configured to protect a seat portion of a vehicle seat and an upper portion that is configured to protect a back portion of the vehicle seat; and
a vehicle door guard comprising a cover portion that is configured to be selectively secured to the lower portion of the vehicle seat cover and one or more fasteners that are configured to selectively support the cover portion from a portion of the vehicle and retain the cover portion in a substantially vertical orientation to protect a door of the vehicle when the door is closed, wherein the one or more fasteners are further configured to selectively retain the cover portion in the substantially vertical orientation when the door is open, thereby selectively providing a barrier between an interior and an exterior of the vehicle when the door is open, and wherein a top of the vehicle door guard includes an elongated bar extending from a first corner to a second corner, the elongated bar being configured to maintain the top of the vehicle door guard in a planar configuration.

12. The vehicle protection system of claim 11, wherein a bottom of the cover portion is flexible, and wherein the bottom of the cover portion is configured to be secured to an underside of the lower portion of the vehicle seat cover.

13. The vehicle protection system of claim 11, wherein the cover comprises multiple layers of material, and wherein the elongated bar is incorporated between layers of the material.

14. The vehicle protection system of claim 11, wherein the elongated bar extends along a rear surface of the cover portion.

15. The vehicle protection system of claim 11, wherein the elongated bar extends along a front surface of the cover portion.

16. A vehicle door guard comprising:
   a cover portion having a top and a bottom, the cover portion being configured to selectively attach to a lower portion of a vehicle seat cover when the vehicle seat cover is installed on a seat portion of a vehicle seat in a vehicle; and
   one or more fasteners that extend from the cover portion, the one or more fasteners being configured to selectively support the cover portion from a portion of the vehicle while the cover portion is secured to the lower portion of the vehicle seat cover to thereby position the cover portion over a door of the vehicle and retain the cover portion in a substantially vertical orientation to protect the door when the door is closed, wherein the one or more fasteners are further configured to selectively retain the cover portion in the substantially vertical orientation when the door is open, thereby selectively providing a barrier between an interior and an exterior of the vehicle when the door is open,
   wherein a top of the vehicle door guard includes an elongated bar extending from a first corner to a second corner, the elongated bar being configured to maintain the top of the vehicle door guard in a planar configuration, and wherein a rear side of the cover portion configured to face the door comprises a non-slip material configured to minimize movement of the cover portion relative to the door.

17. The vehicle door guard of claim 16, wherein the cover portion is configured to selectively extend downward beyond the lower portion of the vehicle seat cover.

18. The vehicle door guard of claim 16, wherein the cover portion has a width that is greater than a width of the seat portion.

19. The vehicle door guard of claim 16, wherein a side of the cover portion is sloped, thereby allowing the side of the cover portion to more closely align with an angle of a seatback portion of the vehicle.

* * * * *